(12) United States Patent
Kauffmann et al.

(10) Patent No.: US 12,553,905 B2
(45) Date of Patent: Feb. 17, 2026

(54) DEVICES AND METHODS FOR PLASMA SEPARATION AND METERING (71) Applicant: Siemens Healthcare Diagnostics Inc., Tarrytown, NY (US)

(72) Inventors: Aaron Kauffmann, Elkhart, IN (US); Jon Stradinger, Kalamazoo, MI (US); David Ledden, Elkhart, IN (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 595 days.

(21) Appl. No.: 18/001,885

(22) PCT Filed: Jun. 28, 2021

(86) PCT No.: PCT/US2021/039341
§ 371 (c)(1),
(2) Date: Dec. 15, 2022

(87) PCT Pub. No.: WO2022/005953
PCT Pub. Date: Jan. 6, 2022

(65) Prior Publication Data
US 2023/0228773 A1    Jul. 20, 2023

Related U.S. Application Data (60) Provisional application No. 63/045,396, filed on Jun. 29, 2020.

(51) Int. Cl.
*G01N 33/80* (2006.01)
*G01N 1/34* (2006.01)
*G01N 33/547* (2006.01)

(52) U.S. Cl.
CPC .............. *G01N 33/80* (2013.01); *G01N 1/34* (2013.01); *G01N 33/547* (2013.01)

(58) Field of Classification Search
None
See application file for complete search history.

(56) References Cited

U.S. PATENT DOCUMENTS

| | | | | |
|---|---|---|---|---|
| 4,933,092 A | * | 6/1990 | Aunet | B01D 39/201 210/732 |
| 5,064,541 A | | 11/1991 | Jeng et al. | |
| 5,135,719 A | | 8/1992 | Hillman et al. | |
| 5,364,533 A | | 11/1994 | Ogura et al. | |
| 5,798,272 A | | 8/1998 | Allen et al. | |
| 5,879,624 A | | 3/1999 | Boehringer et al. | |
| 5,981,294 A | | 11/1999 | Blatt et al. | |

(Continued)

FOREIGN PATENT DOCUMENTS

| | | |
|---|---|---|
| EP | 1119414 A1 | 8/2001 |
| JP | 2009544968 A | 12/2009 |

(Continued)

OTHER PUBLICATIONS

International Search Report and Written Opinion of International Application No. PCT/US2021/039341 dated Oct. 20, 2021.

(Continued)

*Primary Examiner* — Lore R Jarrett (57) ABSTRACT

Devices, assemblies, and kits are disclosed for separating and/or metering a plasma sample from a patient's liquid test sample. Also disclosed are methods of producing and using same.

25 Claims, 6 Drawing Sheets

(56) References Cited

U.S. PATENT DOCUMENTS

| | | | |
|---|---|---|---|
| 10,105,083 B1* | 10/2018 | Tan | A61M 1/3496 |
| 2002/0086417 A1 | 7/2002 | Chen | |
| 2007/0082370 A1 | 4/2007 | Togawa et al. | |
| 2010/0062544 A1 | 3/2010 | Evans et al. | |
| 2010/0093551 A1* | 4/2010 | Montagu | G01N 33/491 |
| | | | 210/120 |
| 2010/0178656 A1 | 7/2010 | Buffiere et al. | |
| 2018/0136194 A1 | 5/2018 | Sinn Blandy et al. | |
| 2018/0252711 A1* | 9/2018 | Harkins | G01N 33/56961 |

FOREIGN PATENT DOCUMENTS

| | | | | |
|---|---|---|---|---|
| JP | 2012530256 A | 11/2012 | | |
| JP | 2019537723 A | 12/2019 | | |
| WO | 2009068027 A1 | 6/2009 | | |
| WO | 2015191450 A1 | 12/2015 | | |
| WO | WO2020013970 A1 * | 1/2020 | | C23C 14/32 |
| WO | 2020180552 A1 | 9/2020 | | |
| WO | 2020251849 A1 | 12/2020 | | |

OTHER PUBLICATIONS

Liu et al., "Membrane-based, sedimentation-assisted plasma separator for point-of-care applications", Anal Chem. Nov. 5, 2013; 85(21): pp. 1-17.

* cited by examiner

DEVICES AND METHODS FOR PLASMA SEPARATION AND METERING

CROSS REFERENCE TO RELATED APPLICATIONS/INCORPORATION BY REFERENCE STATEMENT

This application claims benefit under 35 USC § 119(e) of U.S. Provisional Application No. 63/045,396, filed Jun. 29, 2020. The entire contents of the above-referenced patent application(s) are hereby expressly incorporated herein by reference.

STATEMENT REGARDING FEDERALLY SPONSORED RESEARCH OR DEVELOPMENT

Not Applicable.

BACKGROUND

Plasma, rather than whole blood, is generally the preferred sample for many clinical diagnostic tests. For example, in HIV viral load detection, plasma is separated from whole blood as hemoglobin, and other hemolysis products may interfere with detection of viral RNA. As hemoglobin and other hemolysis products may interfere with assay results, plasma may need to be non-hemolyzed.

Within the industry, the separation of plasma has historically been accomplished through the centrifugation of a patient's whole blood sample which generates plasma which then may be interrogated (either optically or electrochemically) for the detection of hemolyzed hemoglobin. While accurate, the centrifugation process is time consuming, requires additional instrumentation, and is inefficient for point-of-care (POC) applications.

Progress within the medical industry has been in the development of point-of-care systems to provide rapid and portable care. Because of time restraints, size of equipment, and one-operator use, centrifugation is generally impractical for use in such point-of-care diagnostic instruments. Other separation methods including laminar-flow filtration or capillary-action based processes, however, are also expensive, complex, slow, require large volumes of blood, and/or may lead to unacceptable levels of hemolysis. Also, the addition of one or more separation steps may remove the waived status under CLIA for diagnostic assays performed on various diagnostic instruments.

Other previous disclosures in the art related to plasma separation have utilized a potato lectin embedded membrane to separate plasma from a whole blood capillary sample (WO2015/191450), separation of plasmas by a filter membrane (WO2009/068027), or used a pressure driven system (e.g., plunger). These disclosures are problematic, because they are complex, require a large sample size, and/or are not designed to release the plasma sample.

Therefore, there is a continued need in the art for new and improved diagnostic devices and methods that overcome the disadvantages and defects in the prior art. Accordingly, there is a need for new and improved devices and methods for separation of plasma samples that are simple, require smaller samples sizes, and allow for the release of the plasma samples. In particular (but not by way of limitation), there is a current need for an integrated, improved plasma separation and sample metering device that is able to separate and meter a patient's extracted plasma sample for use in at least one analyte(s) detection and/or diagnostic assay. It is to such devices, assemblies, and methods that the present disclosure is directed.

BRIEF DESCRIPTION OF THE DRAWINGS

FIG. 5 graphically depicts a method of using the sample device of FIG. 1 for plasma sample mixing/extraction. First Panel: Sample device and test sample prior to contact. Second Panel: Sample is drawn into the capillary channel of the sample device. Third Panel: Red blood cells (RBC) mix with the lyophilized reagent (such as, but not limited to, lectin and a dye bound to beads). As the reagent mixes, RBC agglutinate, and the amount of free reagent is inversely proportional to the RBC. Fourth Panel: The sample device containing the test sample is positioned and secured within the reaction chamber of the reaction cartridge. Free reagent diffuses out of the sample device with the plasma. The amount of reagent is then correlated to plasma. The lower panel indicates the mixing, agglutination, and diffusion reactions that occur in the corresponding panels there above.

DETAILED DESCRIPTION

Before explaining at least one embodiment of the present disclosure in detail by way of exemplary language and results, it is to be understood that the present disclosure is not limited in its application to the details of construction and the arrangement of the components set forth in the following description. The present disclosure is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the present disclosure shall have the meanings that are commonly understood by those of ordinary skill in the art. Further, unless otherwise required by context, singular terms shall include pluralities and plural terms shall include the singular. The foregoing techniques and procedures are generally performed according to conventional methods well known in the art and as described in various general and more specific references that are cited and discussed throughout the present specification. The nomenclatures utilized in connection with, and the medical procedures and techniques of, surgery, anesthesia, wound healing, and infectious control described herein are those well-known and commonly used in the art. Standard techniques are used for infection diagnostic and therapeutic applications.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the devices, assemblies, and/or methods disclosed herein can be made and executed without undue experimentation in light of the present disclosure. While the devices, assemblies, and/or methods have been described in terms of particular embodiments, it will be apparent to those of skill in the art that variations may be applied to the devices, assemblies, and/or methods and in the steps or in the sequence of steps of the methods described herein without departing from the concept, spirit, and scope of the present disclosure. All such similar substitutions and modifications apparent to those skilled in the art are deemed to be within the spirit, scope, and concept of the present disclosure as defined by the appended claims.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." As such, the terms "a," "an," and "the" include plural referents unless the context clearly indicates otherwise. Thus, for example, reference to "a compound" may refer to one or more compounds, two or more compounds, three or more compounds, four or more compounds, or greater numbers of compounds. The term "plurality" refers to "two or more."

The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z.

The use of ordinal number terminology (i.e., "first," "second," "third," "fourth," etc.) is solely for the purpose of differentiating between two or more items and, unless explicitly stated otherwise, is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive. For example, a condition "A or B" is satisfied by any of the following: A is true (or present) and B is false (or not present), A is false (or not present) and B is true (or present), and both A and B are true (or present).

As used herein, any reference to "one embodiment," "an embodiment," "some embodiments," "one example," "for example," or "an example" means that a particular element, feature, structure, or characteristic described in connection with the embodiment is included in at least one embodiment. The appearance of the phrase "in some embodiments" or "one example" in various places in the specification is not necessarily all referring to the same embodiment, for example. Further, all references to one or more embodiments or examples are to be construed as non-limiting to the claims.

Throughout this application, the term "about" is used to indicate that a value includes the inherent variation of error for a composition/apparatus/device, the method being employed to determine the value, or the variation that exists among the study subjects. For example, but not by way of limitation, when the term "about" is utilized, the designated value may vary by plus or minus twenty percent, or fifteen percent, or twelve percent, or eleven percent, or ten percent, or nine percent, or eight percent, or seven percent, or six percent, or five percent, or four percent, or three percent, or two percent, or one percent from the specified value, as such variations are appropriate to perform the disclosed methods and as understood by persons having ordinary skill in the art.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps. For example, a process, method, article, or apparatus that comprises a list of elements is not necessarily limited to only those elements but may include other elements not expressly listed or inherently present therein.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. The term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

The term "sample" as used herein will be understood to include any type of biological sample that may be utilized in accordance with the present disclosure. In certain embodiments, the sample may be any fluidic sample and/or sample capable of being fluidic (e.g., a biological sample mixed with a fluidic substrate). Examples of biological samples that may be utilized include, but are not limited to, whole blood or any portion thereof (i.e., plasma or serum), saliva, sputum, cerebrospinal fluid (CSF), surgical drain fluid, skin, intestinal fluid, intraperitoneal fluid, cystic fluid, sweat, interstitial fluid, extracellular fluid, tears, mucus, bladder wash, urine, swabs, semen, fecal, pleural fluid, nasopharyngeal fluid, combinations thereof, and the like. In particular (but non-limiting) examples, the biological sample may be urine, stool, sexually transmitted infection (STI) swabs, respiratory collections, and the like.

The term "liquid test sample" as used herein will be understood to include any type of biological fluid sample that may be utilized in accordance with the present disclosure. Examples of biological samples that may be utilized include, but are not limited to, whole blood or any portion thereof (i.e., plasma or serum), saliva, sputum, cerebrospinal fluid (CSF), intestinal fluid, intraperitoneal fluid, cystic fluid, sweat, interstitial fluid, tears, mucus, urine, bladder wash, semen, combinations, and the like. The volume of the sample utilized in accordance with the present disclosure may be in a range of from about 0.1 to about 100 microliters. As used herein, the term "volume" as it relates to the liquid test sample utilized in accordance with the present disclosure means from about 0.1 microliter to about 100 microliters, or from about 1 microliter to about 75 microliters, or from about 2 microliters to about 60 microliters, or less than or equal to about 50 microliters, or less than or equal to about 40 microliters. In one non-limiting embodiment of the present disclosure, the liquid test sample is a patient's whole blood sample comprising and/or consisting of about 10 microliters to about 30 microliters in volume.

The term "patient" includes human and veterinary subjects. In certain embodiments, a patient is a mammal. In certain other embodiments, the patient is a human. "Mammal" for purposes of treatment refers to any animal classified as a mammal, including human, domestic and farm animals, nonhuman primates, and zoo, sports, or pet animals, such as dogs, horses, cats, cows, etc.

The term "plasma" refers to the liquid component of blood that is responsible for holding the blood cells in a whole blood sample in suspension that carries cells and proteins throughout the body. In one non-limiting embodiment, plasma may comprise and/or consist of dissolved proteins and/or analyte(s), such as, by way of example only, serum albumins, globulins, and fibrinogen, glucose, clotting factors, electrolytes, such as, by way of example only, sodium, calcium, magnesium, bicarbonate, chloride ions, hormones, carbon dioxide, and oxygen.

The term "reaction cartridge" includes any device(s) capable of performing at least one diagnostic assay as described herein. The reaction cartridge may perform the diagnostic assay(s) manually, but, in most instances, the reaction cartridge will be inserted into a system that automates the performance of the diagnostic assay(s). In one non-limiting embodiment, the reaction cartridge comprises a reaction cassette for use in automated diagnostic assays conducted by the DCA Vantage® Analyzer commercially available from Siemens Healthineers, Inc.

Turning now to particular embodiments, the present disclosure relates to devices, assemblies, kits, and methods for separating and metering a plasma sample from a patient's liquid test sample for the performance of one or more diagnostic assays. A sample device is constructed for collection of a patient's liquid test sample and separation and/or metering of plasma from the sample. The sample device may be utilized alone, or the sample device may be utilized in an assembly in combination with a reaction cartridge that is constructed for disposal within a diagnostic instrument for the performance of a diagnostic assay on the separated and/or metered plasma sample.

In certain non-limiting embodiments, the sample device includes at least one channel which defines a path for capillary fluid flow and having an opening in an end thereof for drawing the liquid test sample into the sample device. The sample device further includes a cavity in fluidic communication with the at least one channel. The sample device also includes a membrane having an inner surface and an outer surface, wherein the inner surface of the membrane forms at least a portion of at least one side of the cavity; in addition, the membrane has a pore size that substantially prevents agglutinated red blood cells (RBCs) from flowing therethrough. The sample device further includes at least one reagent positioned within the cavity, wherein the at least one reagent comprises an RBC binding or agglutination material.

Certain non-limiting embodiments of the present disclosure are directed to an assembly that includes any of the sample devices disclosed or otherwise contemplated herein and a reaction cartridge. The reaction cartridge has a reaction chamber, and the sample device is positioned and secured within the reaction cartridge of the reaction chamber such that the opening in the end of the at least one channel of the sample device is sealed from communication with the reaction cartridge.

Certain non-limiting embodiments of the present disclosure are directed to a method for separation of plasma from a patient's liquid test sample, wherein the method includes the steps of: (a) contacting a patient's liquid test sample with any of the sample devices disclosed or otherwise contemplated herein, wherein at least a portion of the patient's liquid test sample is drawn into the at least one channel of the sample device via capillary action and enters the cavity of the sample device, wherein the patient's liquid test sample mixes with the at least one reagent, thereby agglutinating RBCs within the patient's liquid test sample; (b) positioning and securing the sample device within a reaction chamber of a reaction cartridge, wherein the sample device is secured such that the opening in the end of the at least one channel of the sample device is sealed from communication with the reaction cartridge; and (c) releasing a buffer solution within the reaction chamber of the reaction cartridge such that the buffer solution contacts the outer surface of the membrane of the sample device, whereby reagent comprising the RBC binding or agglutination material that is not bound to agglutinated RBCs within the cavity of the sample device diffuses through the membrane and into the buffer solution within the reaction chamber.

Certain non-limiting embodiments of the present disclosure are directed to a method for separation and metering of plasma from a patient's liquid test sample. The method includes steps (a)-(c) described herein above and further includes the steps of: (d) positioning the reaction cartridge having the sample device secured therein within an instrument; (e) measuring at least one absorbance value of the buffer solution within the reaction chamber; and (f) determining an estimated volume of plasma present in the reaction chamber based on the at least one absorbance value.

Figure 1:
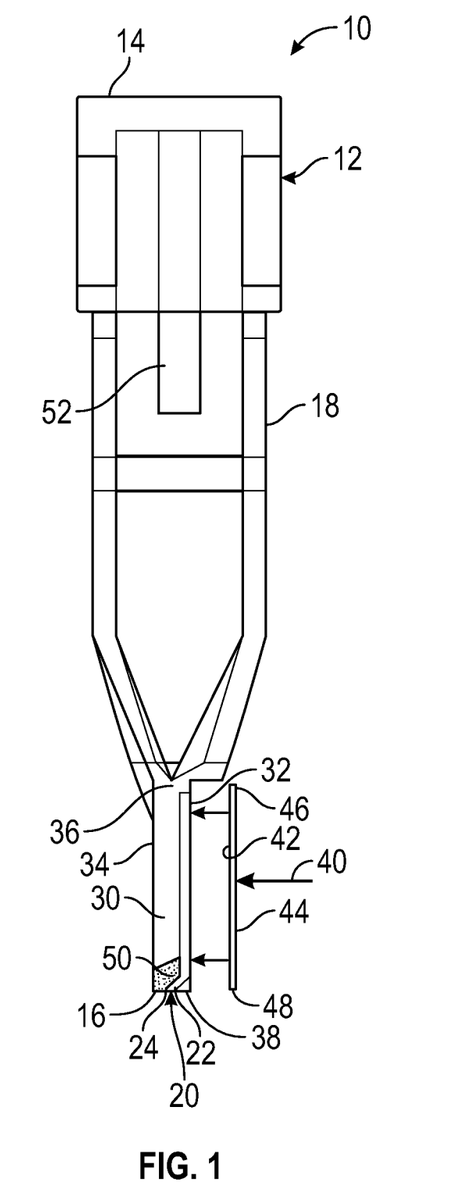
FIG. 1 is a front view of one non-limiting embodiment of a sample device constructed in accordance with the present disclosure.
Figure 2:
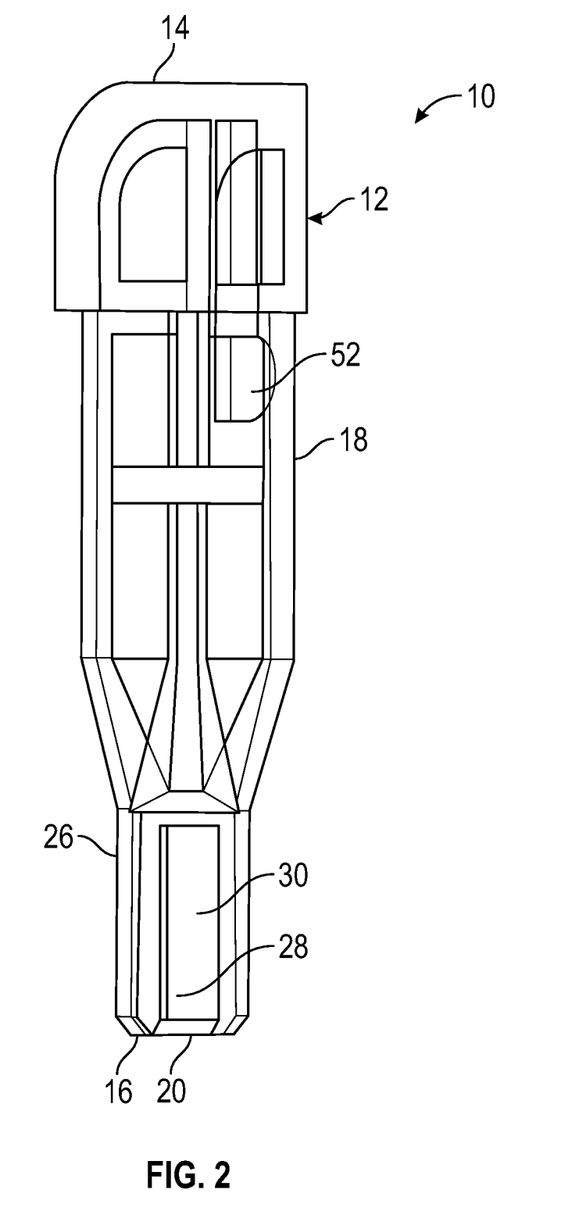
FIG. 2 is a partial profile view of the sample device of FIG. 1.
Figure 3:
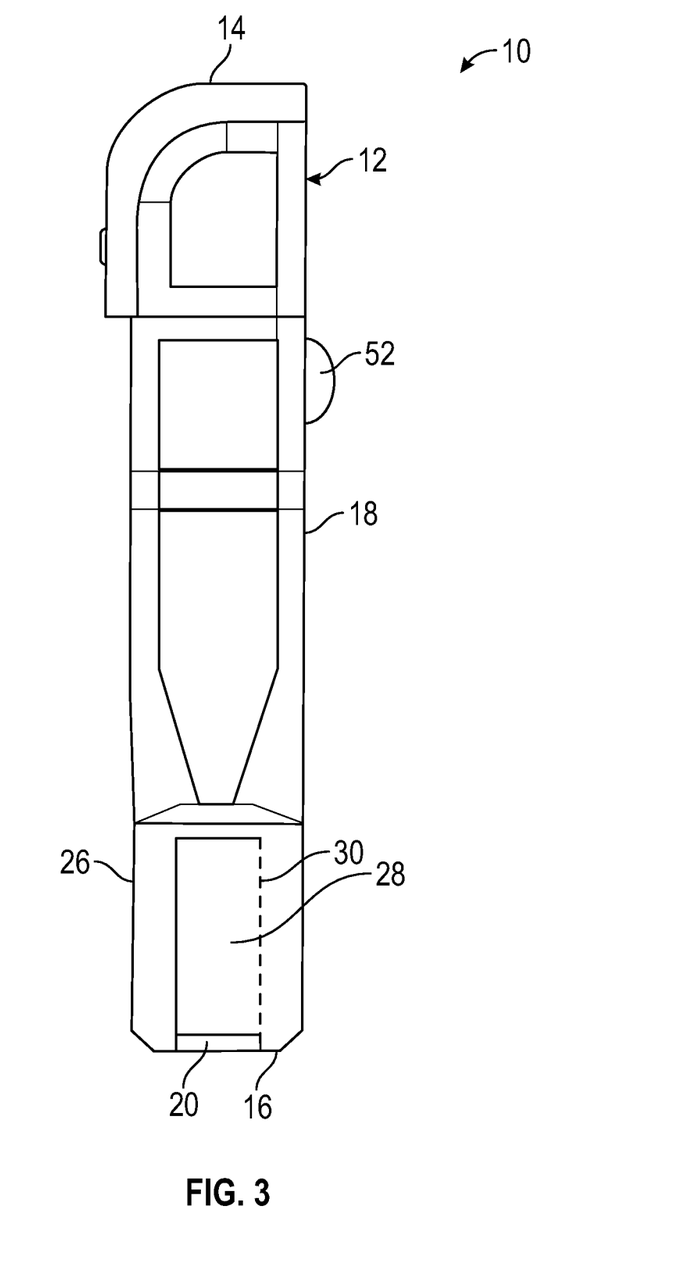
FIG. 3 is a profile view of the sample device of FIG. 1.

Referring now to the Figures, and more particularly to FIGS. 1-3, shown therein is a non-limiting embodiment of a sample device 10 that is constructed for the collection of a patient's liquid test sample as well as separation and/or metering of plasma from the sample. In one non-limiting embodiment, the sample device 10 includes a housing 12, a sample channel 20, a cavity 30, a membrane 40, and at least one reagent 50 disposed in the cavity 30 that comprises an RBC binding or agglutination material.

In certain non-limiting embodiments, the housing 12 includes an upper end 14, a lower end 16, and a sidewall 18. In certain particular (but non-limiting) embodiments, the housing 12 further includes a flange 52 that functions as a locking catch for securing the sample device 10 within a reaction cartridge, as described in further detail herein below.

The housing 12, sample channel 20, and cavity 30 may be integrally formed, such that the lower end 16 of the housing 12 forms the cavity 30 and sample channel 20. Alternatively, the cavity 30 and/or sample channel 20 may be attached to the lower end 16 of the housing 12. Similarly, the flange 52 may be integrally formed with the housing 12 or formed separately and attached to the housing 12.

Each of the housing 12, the cavity 30, the sample channel 20, and/or the flange 52 can be independently constructed of any materials that allow the housing 12, cavity 30, sample channel 20, and/or flange 52 to function in accordance with the present disclosure. Non-limiting examples from which each of the housing 12, cavity 30, sample channel 20, and/or flange 52 can be constructed include, without limitation, synthetic and/or naturally-occurring or derived polymers (both organic and/or inorganic), such as, by way of example only, thermoplastic polymer(s), thermoset polymer(s), elastomer(s), and/or synthetic fiber(s) such as low-density polyethylene, high density polyethylene, polystyrene, polyvinylchloride, styrene butadiene, polyacrylics, polyvinyl acetate, and combinations thereof. The housing 12, cavity 30, sample channel 20, and/or flange 52 can each be configured to be any shape capable of accomplishing the methods of the present disclosure, including, without limitation, circular, ovular, triangular, square, rectangular, trapezoidal, pentagonal, hexagonal, heptagonal, octagonal, nonagonal, decagonal, or polygonal.

The sample channel 20 is configured to collect a patient's liquid test sample. The sample channel 20 defines a path for fluid flow (such as, but not limited to, capillary fluid flow) and has an opening 22 in a lower end 24 thereof for drawing the liquid test sample into the sample device 10. While collection via capillary action is disclosed herein as one non-limiting example of a collection mechanism, a person having ordinary skill in the art should readily appreciate that the patient's liquid test sample can be collected by the sample channel 20 via any method commonly known in the art, including, without limitation, via creation of a negative pressure differential that draws the patient's liquid test sample into the sample channel 20.

The sample channel 20 is open to (i.e., in fluidic communication with) the cavity 30. The cavity 30 has a first longitudinal side 32, a second longitudinal side 34, a first end side 36, and a second end side 38.

The size and volume-capacity of the sample channel 20 and/or the cavity 30 will vary depending on the type and quantity of the patient's liquid test sample being collected. In certain non-limiting embodiments, the sample channel 20 and/or the cavity 30 may be adapted and sized to hold volumes of from about 0.1 microliter to about 100 microliters, or from about 0.5 microliters to about 95 microliters, or from about 1 microliter to about 90 microliters, or from about 2 microliters to about 85 microliters, or from about 5 microliters to about 80 microliters, or from about 10 microliters to about 75 microliters, or from about 15 microliters to about 70 microliters, or from about 20 microliters to about 65 microliters, or from about 25 microliters to about 60 microliters, or from about 30 microliters to about 55 microliters, or from about 35 to about 50 microliters, or less than or equal to about 40 microliters. By way of example only, and not by way of limitation, the volume capacity of the sample channel 20 and/or the cavity 30 may comprise a volume of from about 10 microliters to about 20 microliters when the patient's liquid test sample is whole blood.

The membrane 40 has an inner surface 42 and an outer surface 44 and is disposed within the cavity 30 such that the inner surface 42 of the membrane forms at least a portion of the first longitudinal side 32 of the cavity 30. The membrane 40 has a pore size that substantially prevents agglutinated red blood cells (RBCs) from flowing therethrough.

The membrane 40 is positioned and contained entirely between the first end side 36 and the second end side 38 of the cavity 30 and is configured in a substantially parallel orientation to the sample channel 20; however, a person having ordinary skill in the art should readily appreciate that the membrane 40 may be oriented in any position capable of accomplishing the methods of the present disclosure. In addition, while the membrane 40 is shown as forming at least a portion of the first longitudinal side 32 of the cavity 30, it will be understood that this configuration is for purposes of example only; the membrane 40 may form at least a portion of any side of the cavity 30 (such as, but not limited to, the second longitudinal side 34 of the cavity 30).

The membrane 40 is secured to the cavity 30 and held in place therewithin as a portion of the first longitudinal side 32 thereof by any methods known in the art or otherwise contemplated herein. Non-limiting examples of attachment methods include sonic welding, adhesive, laser welding, and the like, as well as any combinations thereof.

The membrane 40 may be constructed of any material capable of substantially preventing at least agglutinated red blood cells (RBCs) from flowing therethrough, while allowing the plasma to freely move through the membrane 40 and out of the cavity 30 and sample device 10 (as described in further detail hereinbelow). Non-limiting examples of materials from which the membrane 40 can be constructed include lectins, anti-human red blood cell (anti-human RBC) antibodies, nitrocellulose, polysulfone, cellulose, borosilicate, other polymers, and the like, as well as any combinations thereof. Particular non-limiting examples of membranes that can be utilized in accordance with the present disclosure include membranes formed from or embedded with lectins (such as, but not limited to, concanavalin A, lentil lectin, potato lectin, snowdrop lectin, ricin, peanut agglutinin, jacalin, hairy vetch lectin, wheat germ agglutinin, elderberry lectin, *Maackia amurensis* hemagglutinin, *Ulex europaeus* agglutinin, and *Aleuria aurantia* lectin); membranes formed from or embedded with anti-human red blood cell antibodies; an asymmetric polysulfone membrane (VIVID™ plasma separation membrane (Pall Life Sciences, Port Washington, NY)), and combinations thereof.

As stated herein above, the membrane 40 has a pore size that substantially prevents agglutinated red blood cells (RBCs) from flowing therethrough. In certain non-limiting embodiments, the membrane 40 has a pore size of about 0.01 µm, about 0.05 µm, about 0.1 µm, about 0.5 µm, about 1 µm, about 2 µm, about 3 µm, about 4 µm, about 5 µm, about 6 µm, about 7 µm, about 8 µm, about 9 µm, about 10 µm, about 11 µm, about 12 µm, about 13 µm, about 14 µm, about 15 µm, about 16 µm, about 17 µm, about 18 µm, about 19 µm, or about 20 µm. In addition, the membrane 40 may have a pore size that falls within a range of two of the above values (i.e., a range of from about 5 µm to about 20 µm) as well as a value that is an integer that falls between any two of the above values.

In a particular (but non-limiting) embodiment, the membrane 40 has a pore size that is in a range of from about 5

µm to about 20 µm. In another particular (but non-limiting) embodiment, the membrane 40 has a pore size that is less than 5 µm.

In another non-limiting embodiment, the membrane 40 may have a pore size that substantially prevents individual RBCs from flowing through the membrane 40.

The portion of the outer surface 44 of the membrane 40 that is exposed to the exterior of the sample device 10 may be provided with any dimension capable of accomplishing the methods of the present disclosure, including, without limitation, delivery (by diffusion) of a patient's plasma sample into a reaction channel of a reaction cartridge for the conductance of one or more analyte(s) detection and/or diagnostic assays.

The cavity 30 may be formed by any methods known in the art or otherwise contemplated herein. FIGS. 2-3 illustrate one non-limiting embodiment for the construction of the cavity 30. The housing 12 has a lower portion 26 that encompasses the sample channel 20 and the cavity 30. An indentation 28 is formed in the lower portion 26, such that the indentation 28 provides the second longitudinal side 34, the first end side 36, and the second end side 38. Then the membrane 40 is secured in place to form the first longitudinal side 32 of the cavity 30, thereby sealing the cavity 30.

At least one reagent 50 is positioned within the cavity 30. The at least one reagent comprises an RBC binding or agglutination material that reacts with red blood cells present in the patient's liquid test sample and forms agglutination complexes that cannot pass through the membrane 40. Any RBC binding or agglutination materials known in the art or otherwise contemplated herein that are capable of functioning within the sample device 10 in the manner described herein may be utilized in accordance with the present disclosure. Non-limiting examples of RBC binding or agglutination materials that may be utilized in accordance with the present disclosure include an antibody, an agglutination protein, a lectin, and combinations thereof.

In a particular (but non-limiting) embodiment, the RBC binding or agglutination material is selected from the group consisting of concanavalin A, lentil lectin, potato lectin, snowdrop lectin, ricin, peanut agglutinin, jacalin, hairy vetch lectin, wheat germ agglutinin, elderberry lectin, *Maackia amurensis* hemagglutinin, *Ulex europaeus* agglutinin, *Aleuria aurantia* lectin, anti-human red blood cell antibodies, and combinations thereof.

In certain non-limiting embodiments, the RBC binding or agglutination material is bound to a bead. Any beads known in the art or otherwise contemplated herein for use in diagnostic assays may be utilized in accordance with the present disclosure. In addition, the beads may be formed of any materials and be provided with any shape that allows the beads to function in accordance with the present disclosure. The only requirement is that the bead must have a diameter that is smaller than the pore size of the membrane.

Non-limiting examples of materials from which the beads may be formed include of latex, polyethylene, gold sol, iron, borosilicate, soda lime, and combinations thereof.

In certain non-limiting embodiments, the bead has a dye associated therewith. Any dyes known in the art or otherwise contemplated herein may be utilized in accordance with the present disclosure. Non-limiting examples of dyes that may be utilized include Naphthol Green B (700-900 nm), Ferricyanide, Metabisulfite, Taurine (~425 nm), and the like, as well as combinations thereof.

In certain non-limiting embodiments, the at least one reagent 50 may include other reagents in addition to the RBC binding or agglutination material. For example (but not by way of limitation), the at least one reagent 50 may include at least one anticoagulant compound and/or at least one sugar.

Alternatively and/or in addition thereto, at least a portion of the inner surfaces of the channel 20 and/or at least a portion of one or more of the second longitudinal side 34, the first end side 36, and the second end side 38 of the cavity 30 may be pre-coated with at least one anticoagulant and/or at least one hydrophilic material, such as (but not limited to), a sugar.

Non-limiting examples of anticoagulants that may be utilized in accordance with the present disclosure include sodium heparin, lithium heparin, warfarin, rivaroxaban, dabigatran, apixaban, edoxaban, enoxaparin, fondaparinux, ethylenediaminetetraacetic acid (EDTA; such as, but not limited to, K2-EDTA), and the like, as well as combinations thereof. Non-limiting examples of sugars that may be utilized in accordance with the present disclosure include sucrose, trehalose, maltose, dextrose, and the like, as well as combinations thereof.

The at least one reagent 50 may be present in the cavity 30 in any form that allows the compounds present to function in accordance with the present disclosure. For example, but not by way of limitation, the at least one reagent 50 may be present as one or more dried droplets or as one or more lyophilized powder reagents (wherein the dried/lyophilized reagent is readily reconstituted in the liquid test sample drawn into the cavity 30). Alternatively, the at least one reagent 50 may be present in liquid form.

The at least one reagent 50 may be disposed within the cavity 30 in any manner that ensures that the at least one reagent 50 reacts with the patient's liquid test sample upon drawing the sample within the channel 20 and the cavity 30. For example (but not by way of limitation), the at least one reagent 50 may simply be randomly disposed within the cavity 30; alternatively, the at least one reagent 50 may be positioned within the cavity 30 by securing/attaching the at least one reagent 50 to at least a portion of one or more of the sides 32, 34, 36, and 38 of the cavity 30.

Figure 4:
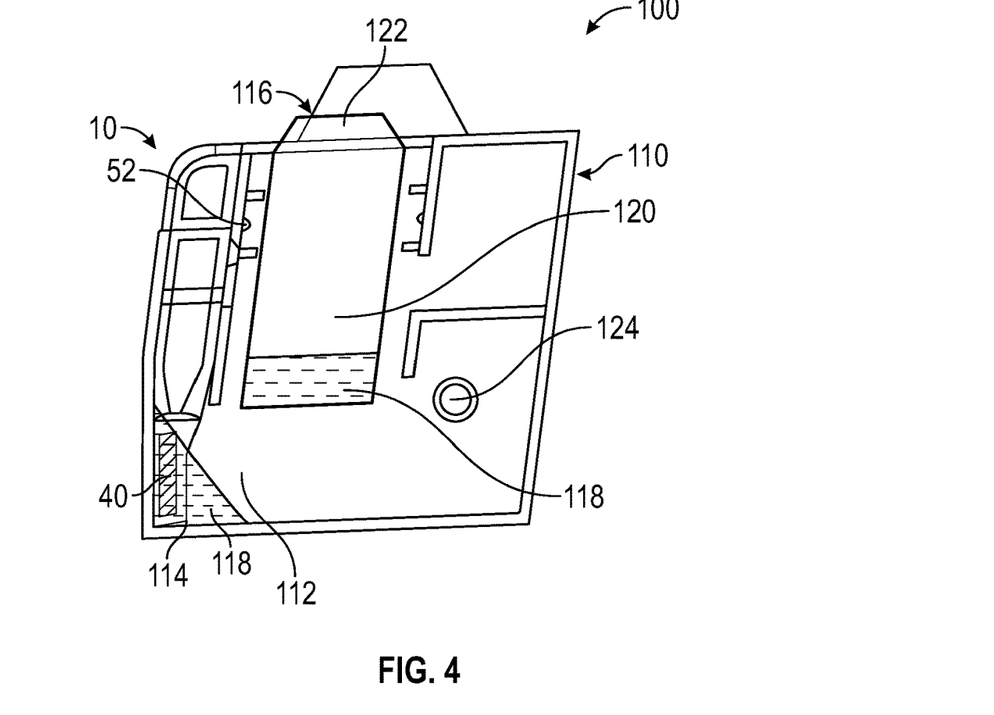
FIG. 4 is a is a side view of the sample device of FIG. 1 which has been positioned and secured within a reaction chamber of a reaction cartridge in accordance with one non-limiting embodiment of the present disclosure.

Referring now to FIG. 4, shown therein is the sample device 10 described in FIGS. 1-3 which has been inserted in and secured within a reaction cartridge 110 to form a diagnostic assay assembly 100. The description of the sample device 10 with respect to FIGS. 1-3 is deemed wholly applicable to the sample device 10 shown in FIG. 4 and, for purposes of brevity, shall not be reiterated herein.

The sample device 10 is positioned within the reaction chamber 112 of the reaction cartridge 110 (and secured therewithin via the flange 52) such that the opening 22 in the channel 20 of the sample device 10 is sealed from communication with the reaction chamber 112. For example (but not by way of limitation), the reaction cartridge 110 is illustrated as having a sealant 114 (such as, but not limited to, rubber or another polymer softened with a plasticizer) that functions to seal the opening 22.

In certain non-limiting embodiments, the reaction cartridge 110 further includes a compartment 116 in which a buffer solution 118 sealed therein. The compartment 116 is sealed with a removable cover 120 that has a tab 122 extending from a portion of an exterior of the reaction cartridge 110. In this manner, the tab 122 can be actuated to release the buffer solution 118 out of the compartment 116 and into the reaction chamber 112 to encounter the membrane 40 of the sample device 10. The interaction of the buffer solution 118 with the membrane 40 causes plasma present in the test sample to diffuse out of the sample device 10 and into the buffer solution 118.

The reaction cartridge 110 may be provided with any shape, configuration, and dimensions that allow the reaction cartridge 110 to function in accordance with the present disclosure. Therefore, the structure shown in FIG. 4 is merely for purposes of example only and should not be construed as limiting.

Therefore, after positioning and securing the sample device 10 within the reaction chamber 112 of the reaction cartridge 110 and pulling the tab 122 to release the buffer solution 118 for contact with the membrane 40 of the sample device 10, plasma diffuses out of the sample device 10 and into the buffer solution 118. In addition, any RBC binding or agglutination material reagent 50 that is not bound to agglutinated RBCs will also diffuse through the membrane 40 and into the buffer solution 118 within the reaction chamber 112.

In this manner, the amount of dye attached to the RBC binding or agglutination material reagent 50 that has diffused through the membrane 40 into the reaction chamber 112 can be determined. The amount of dye present in the reaction chamber 112 is inversely correlated to the hematocrit of the sample, thereby providing an estimate of plasma sample volume for calculating final analyte concentrations.

Figure 5:
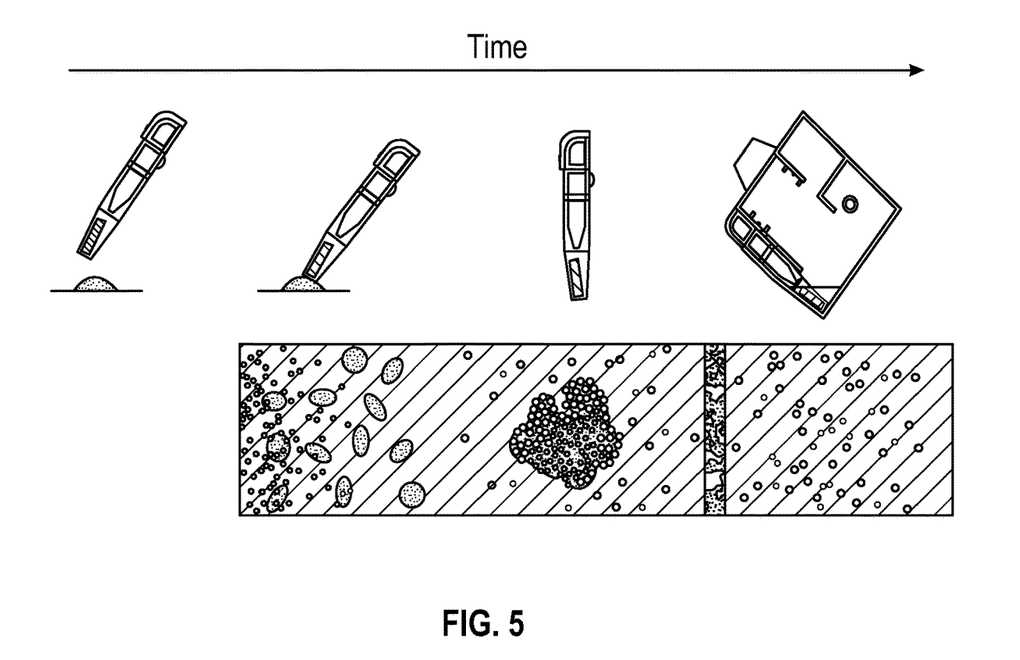

FIG. 5 illustrates a method of using the sample device of FIG. 1 for plasma sample mixing/extraction. The first panel illustrates a sample device constructed in accordance with the present disclosure prior to contact with the test sample; the reagent (such as, but not limited to, lectin and a dye bound to beads) present in the sample device is depicted in color along the length of the membrane (for purposes of example only). In the second panel, the test sample is drawn into the capillary channel of the sample device. As the red blood cells (RBCs) mix with the lyophilized reagent, the RBCs agglutinate; this is indicated by the change in color in the third panel. In the fourth panel, the sample device containing the test sample is positioned and secured within the reaction chamber of the reaction cartridge. Free reagent and plasma then diffuse out of the sample device, and the amount of free reagent is inversely proportional to the RBC present in the test sample. The amount of reagent is then correlated to plasma. The lower panel indicates the mixing, agglutination, and diffusion reactions that occur in the corresponding panels there above.

The assembly 100 may be positioned within a diagnostic instrument and the assembly 100 interrogated to measure at least one absorbance value for the buffer solution 118 present in the reaction chamber 112. Based on this absorbance value, an estimated volume of plasma present in the reaction chamber 112 can be determined.

The wavelength at which the sample is interrogated will be determined based upon the particular dye utilized; determination of particular wavelengths is well within the purview of a person of ordinary skill in the art and is typically disclosed with commercially obtained dyes. Therefore, no further description of selection of particular wavelengths is deemed necessary.

In certain non-limiting embodiments, the at least one absorbance value is measured at a wavelength in a range of from about 430 nm to about 999 nm, such as a range of from about 530 nm to about 750 nm. Particular (but non-limiting) examples of wavelengths that may be utilized include about 531 nm and about 725 nm.

The reaction cartridge may further comprise one or more reagents for performing a diagnostic assay on the separated plasma. For example, it is contemplated that virtually any reagent used in the fields of biological, chemical, or biochemical analyses and assays could be used in the devices, assemblies, kits, and methods of the present disclosure. It is contemplated that these reagents may undergo physical and/or chemical changes when bound to an analyte of interest whereby the intensity, nature, frequency, or type of signal generated by the reagent-analyte complex is directly proportional or inversely proportional to the concentration of the analyte existing within the fluid sample. These reagents may contain indicator dyes, metal, enzymes, polymers, antibodies, and electrochemically reactive ingredients and/or chemicals that, when reacting with an analyte(s) of interest, may exhibit change in color. The only requirement for the diagnostic assay reagent is that said reagent not interfere with the detection and measurement of unbound RBC binding or agglutination material that diffuses through the membrane and into the buffer solution.

Any method of detecting and measuring the analyte in a fluid sample can be used in the devices, assemblies, and methods of the presently claimed and inventive concepts. A variety of assays for detecting analytes are well known in the art and include, but are not limited to, chemical assays, enzyme inhibition assays, antibody stains, latex agglutination, latex agglutination inhibition and immunoassays, such as, radioimmunoassays. The term "antibody" herein is used in the broadest sense and refers to, for example, intact monoclonal antibodies, polyclonal antibodies, multi-specific antibodies (e.g., bispecific antibodies), and to antibody fragments that exhibit the desired biological activity (e.g., antigen/analyte-binding). The antibody can be of any type or class (e.g., IgG, IgE, IgM, IgD, and IgA) or sub-class (e.g., IgG1, IgG2, IgG3, IgG4, IgA1, and IgA2).

While immunoassays (including, but not limited to, sequential analytical chemical and immunoassays) are primarily discussed herein for the detection of at least one analyte of interest present in a liquid test sample, a person having ordinary skill in the art should readily understand that the present disclosure is not strictly limited to immunoassays and may include, byway of example and not by limitation, chemical and chemical-based assays, nucleic acid assays, lipid-based assays, and serology-based assays. Immunoassays, including radioimmunoassays, enzyme-linked immunoassays, and direct label immunoassays (such as, but not limited to, gold sol) are useful methods for use with the presently claimed and disclosed inventive concepts. A variety of immunoassay formats, including, for example, competitive and non-competitive immunoassay formats, antigen/analyte capture assays and two-antibody sandwich assays can be used in the methods of the invention. Enzyme-linked immunosorbent assays (ELISAs) can be used in the presently claimed and disclosed inventive concepts, as well. In the case of an enzyme immunoassay, an enzyme is typically conjugated to a second antibody, generally by means of glutaraldehyde, periodate, hetero-bifunctional crosslinking agents, or biotin-streptavidin complexes. As will be readily recognized by one of ordinary skill in the art, however, a wide variety of different conjugation techniques exist which are readily available for use with the present disclosure.

Assays, including, but not limited to, immunoassays, nucleic acid capture assays, lipid-based assays, and serology-based assays, can be developed for a multiplexed panel of proteins, peptides, and nucleic acids which may be contained within a liquid test sample, with such proteins and peptides including, for example but not by way of limitation, albumin, microalbumin, cholesterol, triglycerides, high-density lipoproteins, low-density lipoproteins, hemoglobin, myoglobin, α-1-microglobin, immunoglobins, enzymes, proteins, glycoproteins, protease inhibitors, drugs, cytokines, creatinine, and glucose. The device(s), assemblies, and method(s) disclosed and/or claimed herein may be used for the analysis of any liquid test sample, including, without limitation, whole blood, plasma, serum, or urine.

Therefore, either simultaneously or wholly or partially sequentially with estimating the volume of plasma present in the reaction chamber 112 of the reaction cartridge 110, the buffer solution 118 may then be mixed with the at least one buffer and/or at least one liquid reagent for the conductance of at least analyte(s) detection and/or diagnostic assay within the reaction chamber 112 of the reaction cartridge 110.

In addition, all of the steps of the method may be completed within any period of time that results in the desired isolation of plasma from the biological sample (as well as performance of the respective diagnostic assay, if present). Non-limiting examples of time periods that may be utilized in accordance with the present disclosure include about 1 second, about 5 seconds, about 10 seconds, about 15 seconds, about 20 seconds, about 30 seconds, about 45 seconds, about 1 minute, about 2 minutes, about 3 minutes, about 4 minutes, about 5 minutes, about 6 minutes, about 7 minutes, about 8 minutes, about 9 minutes, about 10 minutes, about 11 minutes, about 12 minutes, about 13 minutes, about 14 minutes, about 15 minutes, about 16 minutes, about 17 minutes, about 18 minutes, about 19 minutes, about 20 minutes, about 25 minutes, about 30 minutes, or longer. In addition, the method can be completed within a time period that falls within a range of two of the above values, as well as a value that is an integer that falls between any two of the above values.

Figure 6:
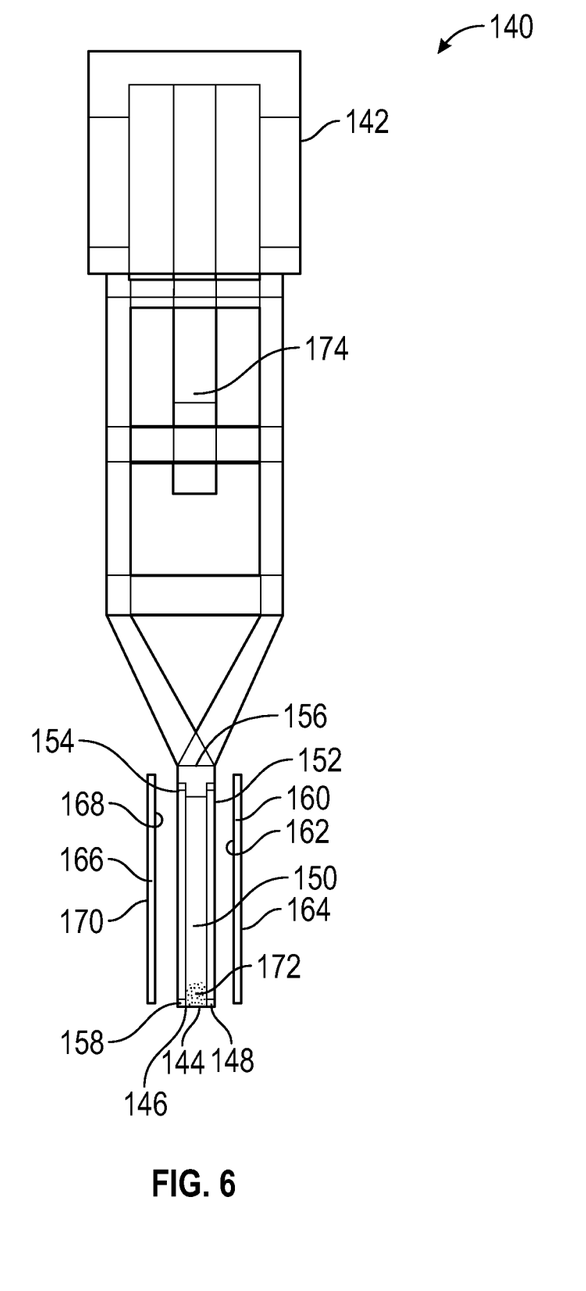
FIG. 6 is a front view of another non-limiting embodiment of a sample device constructed in accordance with the present disclosure.

As stated herein above, the structure shown in FIGS. 1-3 is for the purpose of example only. Other structures that are capable of functioning in accordance with the present disclosure also fall within the scope of the present disclosure. For example (but not by way of limitation), FIG. 6 illustrates another non-limiting embodiment of the sample device of the present disclosure. The sample device 140 shown in FIG. 6 is identical to the sample device 10 of FIGS. 1-4, except as described herein below.

The sample device 140 includes a housing 142, a sample channel 144, a cavity 150, a reagent 172, and a flange 174 which are all constructed in the same or similar manner as the corresponding structures of the sample device 10 shown in FIGS. 1-4. The cavity 150 includes a first longitudinal side 152, a second longitudinal side 154, a first end side 156, and a second end side 158. The sample device 140 differs from the sample device 10 in that the sample device 140 includes two membranes (each of which is constructed in a similar manner and attached to the sample device in the same manner as the membrane 40 of FIGS. 1-4). The first membrane 160 has an inner surface 162 and an outer surface 164. The second membrane 166 has an inner surface 168 and an outer surface 170. The first membrane 160 is disposed within the cavity 150 such that the inner surface 162 of the membrane 160 forms at least a portion of the first longitudinal side 152 of the cavity 150. Similarly, the second membrane 166 is disposed within the cavity 150 such that the inner surface 168 of the membrane 166 forms at least a portion of the second longitudinal side 154 of the cavity 150.

Thus, the outer surface 164 of the first membrane 160 and the outer surface 170 of the second membrane 166 are both exposed on the outer surface of the sample device 140 so that buffer can come into contact with both membranes when the sample device 140 is disposed within a reaction cartridge (similar to that shown in FIG. 4). The presence of the two membranes 160 and 166 increases the surface area available to interact with the buffer solution, thereby increasing the rate of diffusion of plasma out of the sample device 140 and into the buffer present in the cartridge.

In another alternative (but non-limiting) embodiment of the present disclosure, a sample device similar to that shown in FIG. 6 can be constructed in which the capillary channel is split into two with a well and a membrane on either side of the sample device.

EXAMPLES

Examples are provided hereinbelow. However, the present disclosure is to be understood to not be limited in its application to the specific experimentation, results, and laboratory procedures disclosed herein after. Rather, the Examples are simply provided as one of various embodiments and are meant to be exemplary, not exhaustive.

Example 1

FIGS. 1-3 illustrate the structure of a sample device utilized in this Example. However, this particular structure is for purposes of example only; the structure of the sample device may be modified, such as (but not limited to) for compatibility with injection molding.

The capillary channel in the tip of the sample device is offset at an angle; the capillary channel angle is necessary so that as the sample is drawn in and later comes in contact with the separation membrane, the area under the membrane is equal to or less than that of the capillary channel, and the sample will continue to be drawn in to fill the cavity. The angled capillary channel is in contact with the cavity (bottom, 2 sides, and back wall) with the membrane covering the top of the cavity. The membrane is held in place over the cavity by an attachment mechanism such as (but not limited to) sonic welding, adhesive, laser welding, etc. The membrane is formed of one or more materials including lectins, anti-human red blood cell (anti-human RBC) antibodies, an asymmetric polysulfone membrane (VIVID™ plasma separation membrane (Pall Life Sciences, Port Washington, NY)), or the like.

A large ratio of volume to surface area is needed to expedite sample diffusion into the buffer. The sample cavity and inlet will need to be pre-coated with a hydrophilic material, such as (but not limited to) a sugar such as sucrose, trehalose, maltose, dextrose, etc.

Within the cavity are numerous dried droplets or lyophilized powder reagent. This reagent contains anticoagulant (such as, but not limited to, a heparin and/or EDTA) and a Red Blood Cell capture material bound to a bead and a dye. Additionally, sugar may be added for better stability.

Non-limiting examples of RBC capture materials include various lectins, anti-human RBCs, etc. Non-limiting examples of beads include those formed of latex, iron, gold sol, etc., with the only requirement being that the beads be smaller than the pore size of the membrane. Indeed, the entire RBC capture material-bead-dye complex must be smaller than the pore size of the membrane.

Example of Use (as Shown in FIG. 5)

A fingerstick or venous sample is drawn from a patient. The sample device is lowered to contact the capillary channel with the sample. Excess sample on the tip of the sample device is drawn off with a Kimwipe or over Parafilm.

The sample device cavity contains beads, smaller than the pore size, with dye and an RBC binding compound. One or more sugars are also present in the sample device cavity to stabilize dried protein. In addition, the portions of the sample device that come into contact with the sample are pre-coated with sugar(s) or other hydrophilic compound(s) to facilitate capillary action. Without coating, the sample will not enter the sample device.

When the portion of the whole blood sample is drawn into the cavity, the RBC binding compound agglutinates with any RBCs in the sample to produce agglutinated RBC clumps. The agglutinated RBCs have a size greater than the pore size of the membrane, and this prevents the agglutinated RBCs from flowing through the membrane.

Sample to sample variability in surface carbohydrates or other antigen sites should be offset by the use of beads attached to the RBC capture material, kinetically limiting the amount of dye occupied by each RBC.

The sample device is then placed in a cartridge and into an instrument. When the sample device is inserted into the cartridge, it is locked in place, and the capillary channel is pressed into rubber or some other polymer softened with plasticizer to seal the tip. The buffer tab is then pulled, thereby releasing the buffer. The lid on the instrument is then closed, initiating the test. Buffer is washed over the outer surface of the membrane to facilitate the diffusion of unbound beads (dye). There may be occasional checks to determine if enough sample is pulled or if no more sample needs to be pulled. The amount of dye present is inversely correlated to the hematocrit of the sample, thereby providing an estimate of plasma sample volume for calculating final analyte concentrations. The specific diagnostic assay being run is then completed, and results are displayed.

Sample is drawn via capillary into a chamber bounded by a membrane of pore size diameter 5-20 µm. Various membranes were tested using Siemens DCA antibody latex beads, with a 95% lower limit of 6 µm diameter, and a blue bromophenol dye to simulate a blood+dye sample of cell size 6.2-8.2 µm. When 0.22 and 1.5 µm pore size membranes were used, diffusion took approximately 3 hours with agitation. When a 5 µm pore size was used, diffusion of the dye took approximately 30 seconds with agitation. When a 10 µm pore size was tested, the reagent was premixed with agglutinator to increase the effective diameter of the latex beads; this significantly increased the time to diffusion to >3 hours, implying either a larger pore size is needed or less agglutinator than a 1:1 mix is needed.

Example 2

Figure 7:
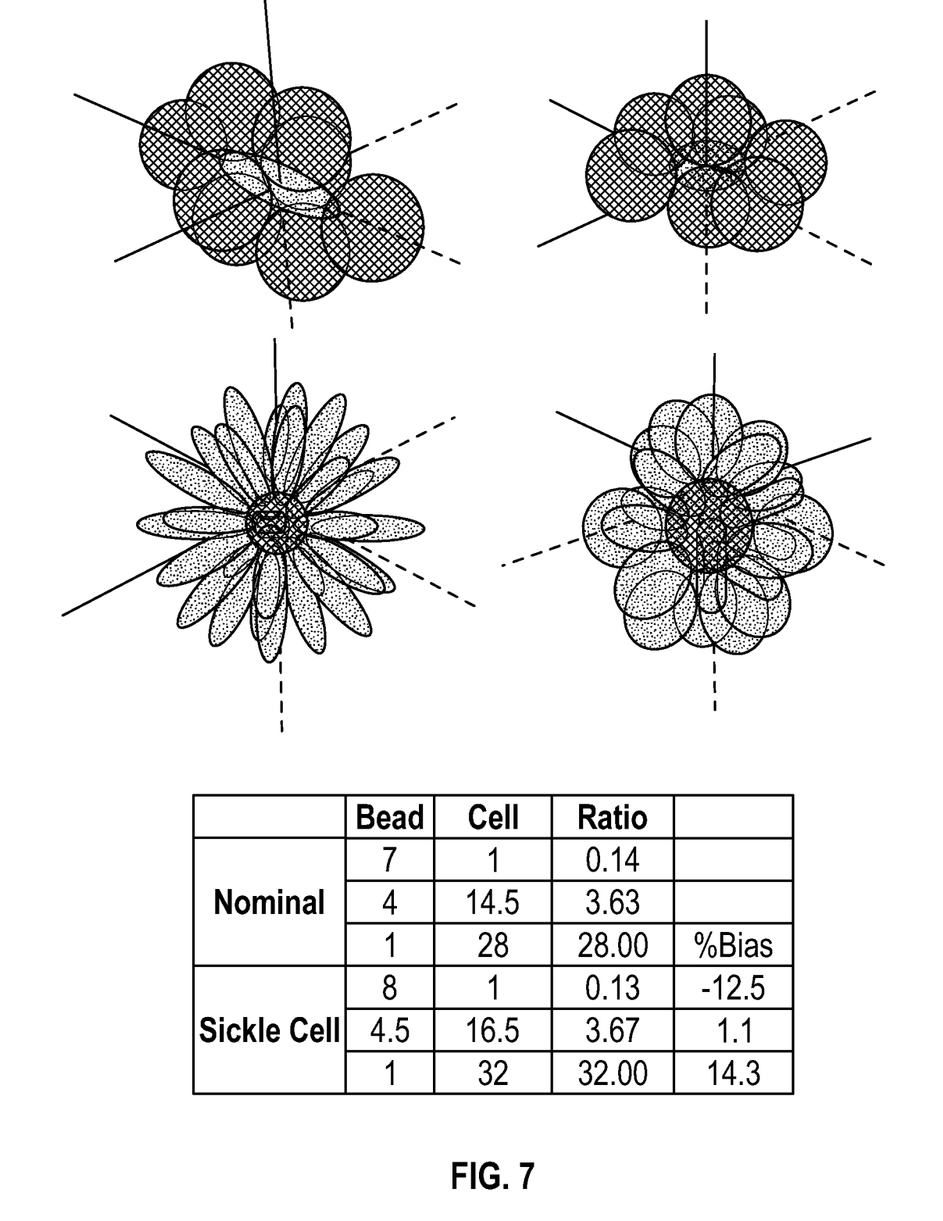
FIG. 7 illustrates space fill models and estimation of potential impact of sickle cell on determining hematocrit by bead/dye binding used in the methods in accordance with the present disclosure.

In FIG. 7, the potential impact of sickle cell on determining hematocrit by the bead/dye binding methods of the present disclosure were analyzed. Space fill models were made using mean measurements of red blood cells and an 8 µm bead (FIG. 7, upper panel). Sickle cells were represented by a 200% elongation and 50% width reduction. From these models, the maximum amounts of beads per cell and cells per bead were estimated (FIG. 7, lower panel). Assuming a normal distribution of both maxima and samples of completely typical and atypical blood, the expected observed bias is ~|1%|.

Thus, in accordance with the present disclosure, there have been provided devices, assemblies, and methods which fully satisfy the objectives and advantages set forth hereinabove. Although the present disclosure has been described in conjunction with the specific drawings, experimentation, results, and language set forth hereinabove, it is evident that many alternatives, modifications, and variations will be apparent to those skilled in the art. Accordingly, it is intended to embrace all such alternatives, modifications, and variations that fall within the spirit and broad scope of the present disclosure.

What is claimed is:

1. A sample device for separation of plasma from a patient's liquid test sample for the performance of at least one diagnostic assay, the sample device comprising:
    at least one channel which defines a path for capillary fluid flow and having an opening in an end thereof for drawing the liquid test sample into the sample device;
    at least one cavity in fluidic communication with the at least one channel;
    at least one membrane having an inner surface and an outer surface, wherein the inner surface of the at least one membrane forms at least a portion of at least one side of the at least one cavity, and wherein the at least one membrane has a pore size that substantially prevents agglutinated red blood cells (RBCs) from flowing therethrough;
    at least one reagent positioned within the at least one cavity, wherein the at least one reagent comprises an RBC binding or agglutination material; and
    wherein the at least one cavity has a first longitudinal side, a second longitudinal side, a first end side, and a second end side, wherein the at least one membrane is secured to the cavity and positioned and contained between the first end side and the second end side of the cavity, wherein the inner surface of the at least one membrane forms at least a portion of the first or second longitudinal side of the cavity, and wherein the outer surface of the at least one membrane is configured for delivery of plasma therethrough via diffusion upon contact with a solution.

2. The sample device of claim 1, wherein the pore size of the at least one membrane is in a range of from about 5 microns to about 20 microns.

3. The sample device of claim 1, wherein the pore size of the at least one membrane is less than 5 microns.

4. The sample device of claim 1, wherein the pore size of the at least one membrane substantially prevents individual RBCs from flowing through the membrane.

5. The sample device of claim 1, wherein the at least one membrane is selected from the group consisting of a nitrocellulose membrane, a polysulfone membrane, a cellulose membrane, a borosilicate membrane, a lectin membrane, a membrane embedded with anti-human red blood cell antibodies, and combinations thereof.

6. The sample device of claim 1, wherein the RBC binding or agglutination material is selected from the group consisting of an antibody, an agglutination protein, a lectin, and combinations thereof.

7. The sample device of claim 6, wherein the RBC binding or agglutination material is selected from the group consisting of concanavalin A, lentil lectin, potato lectin, snowdrop lectin, ricin, peanut agglutinin, jacalin, hairy vetch lectin, wheat germ agglutinin, elderberry lectin, *Maackia amurensis* hemagglutinin, *Ulex europaeus* agglutinin, *Aleuria aurantia* lectin, anti-human red blood cell antibodies, and combinations thereof.

8. The sample device of claim 6, wherein the RBC binding or agglutination material is selected from the group consisting of concanavalin A, lentil lectin, potato lectin, snowdrop lectin, ricin, peanut agglutinin, jacalin, hairy vetch lectin, wheat germ agglutinin, elderberry lectin, *Maackia amurensis* hemagglutinin, *Ulex europaeus* agglutinin, *Aleuria aurantia* lectin, and combinations thereof.

9. The sample device of claim 1, wherein the RBC binding or agglutination material is bound to a bead having a diameter that is smaller than the pore size of the at least one membrane.

10. The sample device of claim 9, wherein the bead is formed of a material selected from the group consisting of latex, polyethylene, gold sol, iron, borosilicate, soda lime, and combinations thereof.

11. The sample device of claim 9, wherein the bead has a dye associated therewith.

12. The sample device of claim 11, wherein the dye is selected from the group consisting of Naphthol Green B, Ferricyanide, Metabisulfite, Taurine, and combinations thereof.

13. The sample device of claim 1, wherein the at least one reagent comprises an anticoagulant.

14. The sample device of claim 13, wherein the anticoagulant is selected from the group consisting of sodium heparin, lithium heparin, warfarin, rivaroxaban, dabigatran, apixaban, edoxaban, enoxaparin, fondaparinux, ethylenediaminetetraacetic acid (EDTA), and combinations thereof.

15. The sample device of claim 1, wherein the inner surface of the at least one membrane forms at least a portion of the first longitudinal side of the cavity, and wherein at least a portion of the at least one channel and at least a portion of each of the second longitudinal side, first end side, and second end side of the at least one cavity is coated with a hydrophilic material.

16. The sample device of claim 15, wherein the hydrophilic material is a sugar selected from the group consisting of sucrose, trehalose, maltose, dextrose, and combinations thereof.

17. The sample device of claim 1, wherein the inner surface of the at least one membrane forms at least a portion of the first longitudinal side of the cavity, and wherein the second longitudinal side, a first end side, and a second end of the at least one cavity are each constructed from at least one material selected from the group consisting of low-density polyethylene, high density polyethylene, polystyrene, polyvinylchloride, styrene butadiene, polyacrylics, polyvinyl acetate, and combinations thereof.

18. The sample device of claim 1, wherein the at least one membrane comprises a first membrane and a second membrane, wherein the inner surface of the first membrane forms at least a portion of the first longitudinal side of the at least one cavity, and wherein the inner surface of the second membrane forms at least a portion of the second longitudinal side of the at least one cavity.

19. The sample device of claim 1, wherein the patient's liquid test sample is collected by and transferred through the sample device via capillary action.

20. An assembly, comprising:
the sample device of any one of claims 1-7, 9-14 and 15-19; and
a reaction cartridge having a reaction chamber; and
wherein the sample device is positioned and secured within the reaction cartridge of the reaction chamber such that the opening in the end of the at least one channel of the sample device is sealed from communication with the reaction cartridge.

21. The assembly of claim 20, wherein the reaction cartridge further comprises a compartment containing buffer solution, wherein the compartment is sealed with a removable cover that has a tab extending from a portion of the reaction cartridge, and whereby actuation of the tab releases the buffer solution into the reaction chamber.

22. A method for separation of plasma from a patient's liquid test sample, the method comprising the steps of:
(a) contacting a patient's liquid test sample with the sample device of any one of claims 1-13 and 15-19, wherein at least a portion of the patient's liquid test sample is drawn into the at least one channel of the sample device via capillary action and enters the at least one cavity of the sample device, wherein the patient's liquid test sample mixes with the at least one reagent, thereby agglutinating RBCs within the patient's liquid test sample;
(b) positioning and securing the sample device within a reaction chamber of a reaction cartridge, wherein the sample device is secured such that the opening in the end of the at least one channel of the sample device is sealed from communication with the reaction cartridge; and
(c) releasing a buffer solution within the reaction chamber of the reaction cartridge such that the buffer solution contacts the outer surface of the at least one membrane of the sample device, whereby the at least one reagent comprising the RBC binding or agglutination material that is not bound to agglutinated RBCs within the at least one cavity of the sample device diffuses through the at least one membrane and into the buffer solution within the reaction chamber.

23. The method of claim 22, further defined as a method for separation and metering of plasma from a patient's liquid test sample, and further comprising the steps of:
(d) positioning the reaction cartridge having the sample device secured therein within an instrument;
(e) measuring at least one absorbance value of the buffer solution within the reaction chamber; and
(f) determining an estimated volume of plasma present in the reaction chamber based on the at least one absorbance value.

24. The method of claim 22, wherein the patient's liquid test sample comprises a volume of whole blood.

25. The method of claim 24, wherein the volume of whole blood is in a range of from about 10 microliters to about 30 microliters.

* * * * *